Figure 1:
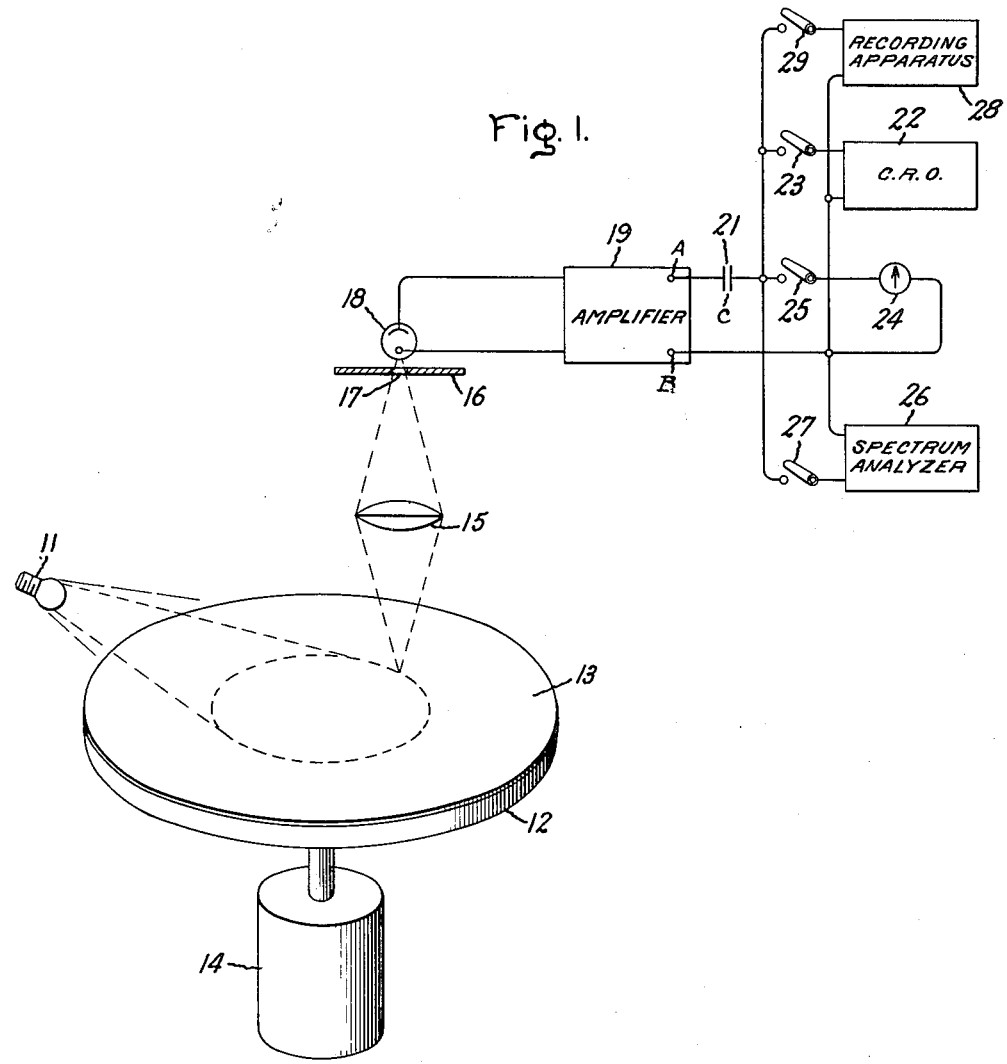

July 24, 1956  E. D. COOK  2,755,702

SMOOTHNESS MONITORING DEVICE

Filed Oct. 11, 1951  2 Sheets-Sheet 1

Inventor:
Ellsworth D. Cook,
by Paul G. Frank
His Attorney.

July 24, 1956 E. D. COOK 2,755,702
SMOOTHNESS MONITORING DEVICE
Filed Oct. 11, 1951 2 Sheets-Sheet 2

Inventor:
Ellsworth D. Cook,
by Paul A. Frank
His Attorney.

United States Patent Office 2,755,702
Patented July 24, 1956

2,755,702

SMOOTHNESS MONITORING DEVICE

Ellsworth D. Cook, Scotia, N. Y., assignor to General Electric Company, a corporation of New York Application October 11, 1951, Serial No. 250,880

7 Claims. (Cl. 88—14)

This invention relates to a smoothness monitoring device.

More particularly, the invention relates to a new means for determining the roughness of the surface structure of materials made up of microscopic granular particles.

In the manufacture and use of materials comprised of microscopic granular particles, it is quite frequently desirable to obtain some idea of the structural arrangement of the particles at the surface of the material in order to determine the characteristics or qualities of the material. One example of a material of this class is paper manufactured from pulp wood, for such paper is comprised of a number of inter-meshed, microscopic wood fibers held together by mutual interlocking of the microscopic wood fibers. The characteristics of this paper are generally determined by the manner in which the microscopic wood fibers are held together, for this latter factor in turn determines the charactertistics or qualities of the finished paper, such as the manner in which ink will be absorbed, its light reflecting characteristic, its softness, etc. Consequently, in order to control the quality or characteristics of pulp wood paper during manufacture thereof, it is first necessary to obtain some information pertaining to the arrangement of the microscopic wood fibers in its surface structure. This information can then be used in modifying the manufacturing process to provide the desired quality paper.

In the past, commercial devices have been made for determining the microscopic surface structure characteristics of materials of this general class, which have operated on the principle of a phonograph in that they have utilized special pickup heads employing a stylus which rides on the surface of the material, and furnish a record of the profile of the surface in the form of alternating electrical signal indicative of the roughness of the surface in question. This method of determining microscopic surface structure characteristics has not been entirely satisfactory for paper because of inherent limitations which include the possibility of tearing the paper or material being tested, the slow speed at which the material must move while being monitored, and its inability to furnish sufficient information to form a complete picture of the microscopic surface structure. Other devices are available in the art, such as gloss meters which can be used to provide a measure of the gloss of paper by determining the ratio of specularly reflected light to diffusely reflected light. However, these devices likewise do not furnish sufficient information on profile or surface to form a complete picture of the microscopic surface structure, and consequently are not suitable for the purpose intended.

It is, therefore, one object of the present invention to provide a new means for measuring the roughness of the surface of materials composed of the microscopic granular particles.

Another object of the invention is to provide a non-contacting smoothness monitoring device for materials composed of microscopic granular particles which does not tear or otherwise destroy the material during the monitoring operation.

A further object of the invention is to provide a smoothness monitoring device which can be used to determine the roughness of materials composed of microscopic granular particles while such material is traveling at any desired speed.

A still further object of the invention is to provide a new means for obtaining quantitative, as well as qualitative information concerning the surface particle arrangement of materials comprised of microscopic granular particles.

Briefly stated, the present invention provides a novel method of determining the roughness of the surface structure of materials comprised of elemental, microscopic granular particles which includes illuminating the surface of the material to be monitored in a manner such that the microscopic surface structure is emphasized, optically producing magnified images representative of the arrangement of the microscopic granular particles in the surface being examined, converting the images thus produced into electrical signals indicative of the arrangement of the granular particles, and producing indications of the of the particle arrangement from electrical signals thus developed.

For the purpose of carrying out the above-described method, the invention also provides a novel smoothness monitoring device which includes a light source for illuminating the material to be monitored in a manner such that its microscopic surface structure is emphasized, an optical system for reproducing images of the microscopic surface structure of the material, means for moving the material and the optical system relative to one another, an electron optics device disposed in the image path of the optical system for producing electrical signals indicative of the condition of the microscopic surface structure surveyed by the optical system, and instrument means connected to the electron optics device for producing perceptible indications of the electrical signals thus developed.

Figure 3:
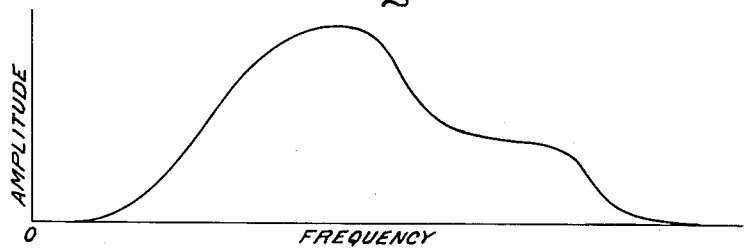
Figure 2:
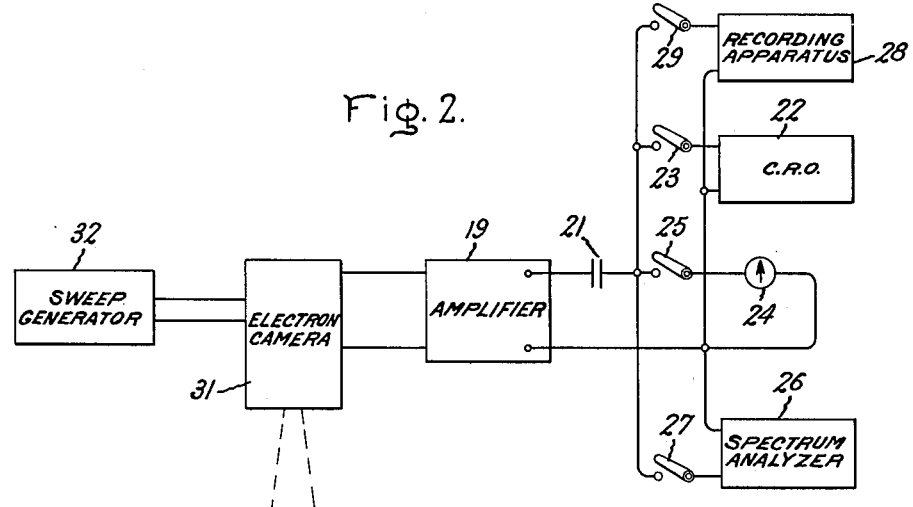
Figure 2:
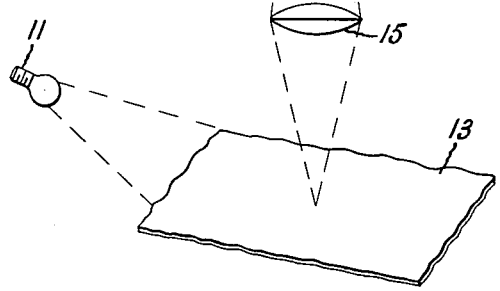
Figure 4:
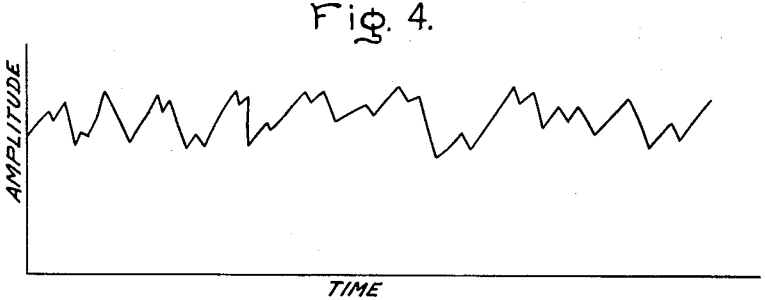

Other objects, features and many of the attendant advantages of this invention will be appreciated more readily as the same becomes understood by reference to the following detailed description, when considered in connection with the accompanying drawings, wherein like parts in all of the several figures are designated by the same reference character, and wherein Figure 1 is a schematic diagram of a smoothness monitoring device constructed in accordance with the invention, and by means of which the novel method for determining smoothness of paper and similar materials is carried out; Figure 2 is a schematic diagram of a second embodiment of the smoothness monitoring device; Figure 3 is a graph relating the amplitude of the response signal obtained by means of the novel smoothness monitoring method to the size of the granular particles in the material being monitored; and Figure 4 is a graph illustrating the surface profile of a particular material, obtained by means of the novel smoothness monitoring method.

Referring now to Figure 1 of the drawing, one embodiment of a smooth monitoring device by means of which the novel smoothness monitoring method is carried out, is illustrated. The device shown includes a source of light 11 of constant intensity which is physically disposed to one side of a material moving means. The material moving means comprises a turntable 12 driven by a motor 14 having positioned on the upper surface thereof a sample 13 of the paper or other material desired to be monitored. By positioning the turntable 12 to one side of light source 11, light shines on the surface of the sample 13 at a glancing oblique angle in such a manner that the raised microscopic particles in the surface of the sample cast shadows over the surrounding surface, and emphasizes the difference in the microscopic "mountains" and "valleys" that form the surface. While the particular material moving means disclosed comprises a turntable for receiving a sample of the material, it is to be expressly understood that the device could be easily mounted on a material making machine so as to monitor a continuous belt of the material as the same moves past the device during the manufacturing process.

Physically disposed in a light path that is preferably normal to the surface of the material 13, is an optical means or system for reproducing images of the microscopic surface of the sample of material 13. The optical means includes a magnifying lens 15 which is preferably a microscope objective lens having a relatively large optical magnification, for example, in the neighborhood of 10 or more. Physically disposed in the image path of lens 15, is a disk 16 having an aperture 17 therein through which light rays may pass. Aperture 17 has a diameter which is related to the optical magnification of the lens 15, and together with the lens 15 serves to restrict the area scanned on the surface of material 13 to dimensions of the order of the microscopic granular particles out of which the material 13 is constructed. For example, if the lens 15 has an optical magnification in the negihborhood of 10, and the diameter of the aperture 17 is in the neighborhood of $\frac{1}{100}$ of an inch, the image produced at the focal point of the lens is converted into an effective viewing area, when referred to the surface of material 13, of some $\frac{1}{1000}$ of an inch in diameter. This is approximately the size of the granular particles out of which material 13 is constructed.

Disposed adjacent disk 16 in the image path of the light rays passing through aperture 17, is an electron-optics device which comprises a photo-multiplier tube 18 physically situated at the focal point of the lens 15. The output of photo-multiplier tube 18 is coupled to a wide band pass amplifier 19 of standard construction which in turn has its output coupled through a direct current blocking capacitor 21 to a means for indicating the value of the signals produced by the photo-multiplier tube. This last mentioned means may include any one of the following instruments means alone, but preferably comprises all of the following: a cathode ray oscilloscope 22 adapted to be selectively coupled to the output of amplifier 19 through a selecting switch 23, a root means square meter 24 coupled through a selecting switch 25 to the output of amplifier 19, a spectrum analyzer device 26 connected to the output of amplifier 19 through a selecting switch 27, and a recording apparatus 28 connectable to amplifier 19 through a selecting switch 29.

In carrying out the novel roughness determination method with the above-described apparatus, the sample of material 13 to be monitored is situated on turntable 12, and the turntable rotated. The speed with which the turntable 12 is rotated, is dependent upon the particular measurement to be made, and this of course determines which ones of the indicating instrument means 22, 24, 26, and 28, are used. As the sample of material 13 rotates, the intensity of the light derived from the microscopic area surveyed by lens 15 will vary in accordance with the shape of the microscopic "mountains" and "valleys" of the surface. This is believed to be evident from a consideration of the manner in which shadows are formed by the oblique lighting of the surface of the material 13, and from the fact that as the turntable passes through one cycle, alternate bright and dark spots will be brought into the viewing area of the optical system. The varying intensity image produced by lens 15 is focused on photo-multiplier tube 18, and causes that device to produce an alternating electrical signal whose variations correspond to the varying intensity light emanating from the microscopic area of the surface structure of material 13. The alternating current signal produced by photo-multiplier tube 18 is amplified by amplifier 19, and fed to selected ones of the indicating instruments 22, 23, 26, and 28 through blocking capacitor 21 which serves to erase the direct current component of the signal produced by photo-multiplier tube 18. The alternating current signal output from amplifier 19 serves to activate the various indicating instruments 22, 24, 26 and 28, when the respective switches 23, 25, 27 and 29 are closed. The indications produced by each of the foregoing instruments will be discussed in detail later. Fig. 4 shows the appearance of the alternating current signal emanating from amplifier 19, and it will be apparent that this waveform is composed of many frequencies. The spectrum analyzer 26, later described in detail, indicates the amplitude of the waveform shown in Fig. 4, at various selected frequencies. A plot of amplitude v. frequency can then be made, which plot is shown in Fig. 3, and which serves as an accurate indication of the spacing of the particles in the surface of the material under test. Since equal amplitudes represent the same size particles, the wave length of the frequency at any given amplitude is a measure of the distance between particles of equal size.

In order to obtain an indication of the average roughness or size of the microscopic "mountains" and "valleys" in the surface of material 13, the switch 25 is closed, thereby coupling root mean square meter 24 to the output of photo-multiplier tube 18 through amplifier 19 and capacitor 21. The turntable 12 is then rotated at a speed such that the material 13 moves past the scanning area of the lens 15 at a speed sufficiently slow such that the optical means can discriminate between the light and dark areas in the surface of material 13. For best results, it has been determined that this speed should be in the vicinity of five inches per second. However, it is to be understood that the exact speed is not limited to the value given, but may be varied in accordance with the ability of the system to follow the microscopic irregularities in the surface of material 13. Upon the application of the alternating signal produced by photomultiplier tube 18 to meter 24, the meter will indicate the root means square value of the signal, thereby giving an indication of the average depth of the microscopic "mountains" and "valleys" in the surface of material 13.

If desired, an analysis of the frequency component of the alternating signal produced by photo-multiplier tube 18 may be obtained by merely closing the selective switch 27, and coupling spectrum analyzer 26 to the output of amplifier 19, while the turntable 12 is rotating the sample of material 13 at substantially the same speed as that used while the root mean square value of the signal was measured. The spectrum analyzer 26 is a conventional wave analyzer available on the market commercially, and comprises a plurality of resonant circuits tuned to different frequencies, and a meter which can be selectively switched across any one of the resonant circuits for indicating the amplitude of the alternating current components at the particular frequency to which that circuit is tuned. By taking a number of readings at different frequencies with the analyzer, a curve such as Figure 3 of the drawings may be plotted relating the amplitude and frequency characteristics of the alternating signal developed by tube 18. By correlating this information with the speed of rotation of the sample of material 13, the graph shown in Figure 3 may be interpreted in terms of the equivalent wave length at the paper surface, thereby giving an indication of the distribution of the granular particles in the paper. As an example, if the grains in the material are uniformly disposed throughout each linear inch of its surface, and if the material is moving at a speed that is constant, the evenly distributed microscopic "mountains" and "valleys" will produce variations in the intensity of the light reaching tube 18 at a fixed repetition frequency. However, in actual practice it is impossible to obtain a sample of material wherein the grains are so evenly distributed, and consequently the variations in the intensity of the light reaching tube 18 have a frequency distribution such as that shown in Fig. 3. A consideration of the distribution of the granular particles, along with the r. m. s. value of alternating signal provided by meter 24, then provides a great deal of information about the smoothness of material 13.

If, in addition, it is desired to obtain a record or picture of the profile of the material surface, meter 24 and spectrum analyzer 26 are disconnected from the output of amplifier 19 by opening each of the switches 25 and 27, and cathode ray oscilloscope 22 and/or recording apparatus 28 connected to the output of amplifier 19 by closing switch 23 and/or switch 24. Turntable 12 is then rotated at a comparatively slow speed dependent upon the response time of instruments 22 or 28, for example, in the order of 1/100 of an inch per second for a recorder such as instrument 28 or somewhat faster for a cathode ray oscilloscope such as instrument 22 if a continuous visual picture is desired. The variations of intensity of the light beam converted by photo-multiplier tube 18 into an alternating current signal are then reproduced by cathode ray oscilloscope 22 and, if desired, permanently recorded on recording apparatus 28. The curve reproduced on the recording apparatus 28 or picture tube of cathode ray oscilloscope 22, is illustrated in Fig. 4 of the drawings, and has "mountains" and "valleys" which correspond to the actual microscopic "mountains" and "valleys" of the surface irregularities in the sample of material 13. Thus, the picture presented by recording apparatus 28 or the cathode ray oscilloscope 22 can be used to reconstruct the profile of the surface of material 13 exactly in wavelength of roughness and to a high degree of correspondence in amplitude.

Referring now to Figure 2 of the drawings, a second embodiment of a smooth monitoring device whereby the novel method of roughness determination may be carried out, is illustrated. This embodiment of the device may be used to inspect a portion of the material 13, to be monitored while the same is an integral part of a belt of material being manufactured, or alternatively, the subject embodiment of the device may be used with a portion of material 13 that is stationary. The material 13 is illuminated by a source 11 of constant intensity light that is spaced to one side of the material so that the light rays therefrom strike the surface of the material 13 at a very large oblique angle, and emphasize the microscopic surface irregularities of the material in a manner similar to that described in the relation to the embodiment of the smoothness monitoring device shown in Figure 1 of the drawings.

Positioned in a light path that is preferably normal to the surface of material 14 is an optical means that includes a lens 15 which comprises a microscopic objective lens and which corresponds to the lens 15 in the device shown in Figure 1 of the drawings. Lens 15 is positioned so that the image passed thereby is focused on a plane coincident with the face of an electron optics device comprising a part of the overall smoothness monitor. The electron optics device upon which the image produced by magnifying lens 15 is focused, comprises an electron camera tube 31 such as an iconoscope, an image orthicon, or an image dissector tube, and may be controlled by a sweep generator 32 which causes the image focussed on the face of the tube to be effectively scanned point by point by a stream of electrons whose flow is dependent upon the intensity of illumination of each point as the electron beam scans the same. Consequently, the electron current in the camera tube varies from point to point, and the variations of the electron current are a measure of the instantaneous irregularities in the microscopic surface structure of the portion of the material 14 surveyed by magnifying lens 15. By utilizing a lens having a proper optical magnification, and positioning lens 15 properly with reference to the face of camera tube 31, a relation can be established such that a point on the image focused on the face of electron camera tube 31 represents an equivalent microscopic area on the surface of the sample of material 13 which is of the order of the size of the granular particles comprising material 13. If thus constructed, the variations in the electron current of camera tube 31 will be representative of the microscopic surface irregularities in the surface of material 13.

Connected to the output of electron camera tube 31 is an amplifier 19 having its output coupled through a direct current blocking resistor 21 to a means for indicating the value of the signal produced by electron camera tube 31, and includes a cathode ray oscilloscope 22, a root mean square meter, 24, a spectrum analyzer 26 and recording apparatus 28, each of which is selectively connected to the output of amplifier 19 by a respective selecting switch 23, 25, 27, and 29. All of the components 19—29 of the device shown in Figure 2 are similar in construction to the correspondingly numbered elements of the device shown in Figure 1, and function in the same manner.

In operation, light intensity images of the portion of material 13 surveyed by lens 15 are focused on the picture face of electron camera tube 31. If the material 13 is moving relative to lens 15, the image produced by lens 15 need not be scanned by electron camera tube 31 for the image will be constantly changing in accordance with the change in irregularities in the microscopic surface structure of the material. Should this be the case, there would be no use for the sweep generator 32 for it would be sufficient for the electron camera tube to scan only one spot on the image focused on its face. This particular spot would correspond to an equivalent microscopic area of the order of the granular particles on the surface of material 13, and a variation of the intensity of the light at this spot would be a measure of the irregularities occurring in the surface of material 13. The variations in the electron current of camera tube 31 are then amplified by an amplifier 19, and the D. C. component of the signal eliminated by blocking capacitor 21, and the resulting signal applied to any one of the indicating instruments 22, 24, 26, and 28 in the manner described in relation to Figure 1.

In the event that a portion of the material 13 is stationary, it is essential that the electron camera tube 31 scan the image focused on its face by lens 15 in order to produce an alternating signal indicative of the irregularities in the microscopic surface structure of the material 13. Consequently, when the portion of material 13 is stationary, sweep generator 32 is used to control the scanning action of electron camera tube 31, and causes the same to scan the image focused on its face from point to point. As previously stated, each point of the image on the face of the camera tube 31 corresponds to an equivalent area on the sample 13 of the order of the microscopic granular particles, and consequently, the variations in intensity of the light from point to point on the image on the face of the camera tube is a measure of the surface irregularities of the sample of material 13. This varying signal is amplified by amplifier 19, the direct current component of the signal eliminated by capacitor 21, and an indication of the signal obtained by selectively applying the same to any one of the instruments 22, 24, 26, and 28.

From the foregoing description, it can be appreciated that the present invention provides a novel method and means for measuring the roughness of materials composed of microscopic granular particles. The means provided by the invention is a non-contacting roughness determination device which cannot tear or otherwise destroy the material being monitored, and which can be used to monitor material at any desired speed. Further, the novel roughness determination method and means provides sufficient information pertaining to the microscopic surface structure of materials, to form a generally complete picture of such surface structure.

Obviously many modifications and variations of the present invention are possible in the light of the above teachings, and it is therefore to be understood that changes may be made herein which are within the full intended scope of this invention as defined by the appended claims.

What I claim as new and desire to secure by Letters Patent of the United States is:

1. A smoothness monitoring device including in combination means for illuminating the material to be monitored with light rays that form a relatively large oblique angle with respect to a normal to the surface of the material whereby the microscopic surface structure of said material is emphasized, optical means positioned substantially normal to the surface of the material at the point of illumination for reproducing magnified images of minute portions of the microscopic surface structure of said material, said optical means including a magnifying lens and in apertured opaque member positioned adjacent said lens in the image path thereof, means for moving said material and said optical means relative to one another, electron-optics means comprising a photo-electric cell disposed in the image path of said optical means for producing electrical signals indicative of the condition of the microscopic surface structure surveyed by said optical means, and means connected to said electron-optics device for producing a perceptible indication of the electrical signals whereby an indication of the smoothness of the material is given.

2. A smoothness monitoring device including in combination means for illuminating the material to be monitored with light rays that form a relatively large oblique angle with respect to a normal to the surface of the material whereby the microscopic granular surface structure of the material is emphasized, optical means positioned substantially normal to the surface of the material at the point of illumination for reproducing magnified images of portions of the microscopic surface structure of said material, said optical means including a magnifying lens assembly and an apertured opaque disk positioned adjacent said lens assembly in the image path thereof, means for moving said material and said optical means relative to one another, an electron-optics device comprising a photo-electric cell disposed in the image path of said lens for producing electrical signals indicative of the condition of portions of the microscopic surface structure surveyed by said optical means, and means connected to said electron-optics device for in indicating the value of the signals produced thereby, said last-mentioned means comprising a means for blocking the direct current component of the output signal of said photo-electric cell, and instrument means for producing an indication of the alternating component of said signals coupled to said direct current blocking means.

3. A smoothness monitoring device including in combination means for illuminating the material to be monitored with light rays that form a relatively large oblique angle with respect to a normal to the surface of the material whereby the microscopic granular surface structure of the material is emphasized, optical means positioned substantially normal to the surface of the material at the point of illumination and including a lens for reproducing magnified images of portions of the microscopic surface structure of said material, an electron-optics device comprising an electron camera tube disposed in the image path of said lens for producing electrical signals indicative of the condition of the microscopic surface structure surveyed by said lens, and means connected to said electron camera tube for indicating the value of the signals produced thereby, said last-mentioned means comprising a means for blocking the direct current component of the output signal of said electron camera tube, and instrument means for producing an indication of the alternating current component of said signals coupled to said direct current blocking means and thereby indicating the smoothness of the material monitored.

4. A device for monitoring the characteristics of the surface of a material, said surface having granular particles of differing heights therein, including in combination means for illuminating the surface of the material to be monitored with light rays that form a relatively large oblique angle with respect to a normal to said surface so that said granular particles are optically emphasized, optical means positioned substantially normal to said surface for producing enlarged images of minute portions of the optically emphasized microscopic surface structure of said material, electron-optics means disposed in the image path of said optical means, means for causing said electron-optics device to successively receive illumination from adjacent minute portions of the monitored material thereby producing a complex continuous electrical waveform which, due to the variation in the height and spacing of said particles, varies in amplitude with respect to time, and spectrum analyzer means coupled to the output of said electron-optics means for determining the amplitude of said waveform at a plurality of the frequencies which it includes in order to determine the distribution of said granular particles.

5. The device of claim 4, further including means coupled to the output of said electron-optics means for measuring the root mean square value of said waveform to provide an indication of the average height of said particles.

6. The device of claim 5, wherein said means for causing said electron-optics device to successively receive illumination from adjacent minute portions of the monitored material comprises means for moving said material and said optical means relative to one another.

7. The device of claim 5, wherein said electron-optics means comprises an electron camera means having the images of said optical means focused on its face and said means for causing said electron-optics means to successively receive illumination from adjacent minute portions of the monitored material comprises means for causing said electron camera means to scan said images.

References Cited in the file of this patent

UNITED STATES PATENTS

| | | |
|---|---|---|
| 1,640,567 | Firestone | Aug. 30, 1927 |
| 1,991,599 | Davis | Feb. 19, 1935 |
| 2,185,010 | Young | Dec. 26, 1939 |
| 2,315,282 | Snow | Mar. 30, 1943 |
| 2,393,631 | Harrison et al. | Jan. 29, 1946 |
| 2,502,503 | Berkley | Apr. 4, 1950 |
| 2,604,809 | Mitchell | July 29, 1952 |
| 2,641,158 | Sweet | June 9, 1953 |